United States Patent [19]

Hartung

[11] 3,830,326

[45] Aug. 20, 1974

[54] GAS TURBINE AUTOMOTIVE MACHINE

[76] Inventor: Raymond E. Hartung, 7381 Memory Ln., Fridley, Minn. 55432

[22] Filed: Dec. 13, 1972

[21] Appl. No.: 314,680

[52] U.S. Cl. ............... 180/66 B, 60/36, 180/54 B, 192/51, 417/223
[51] Int. Cl. .................... B60k 17/02, B60k 3/04
[58] Field of Search .............. 180/66 B, 54 B, 66 R; 60/36, 421; 123/1 A; 417/319, 223; 192/48.91, 51

[56] References Cited
UNITED STATES PATENTS

| | | | |
|---|---|---|---|
| 672,256 | 4/1901 | Bobrick | 60/36 |
| 2,247,962 | 7/1941 | Ormsby et al. | 180/68 R X |
| 2,355,604 | 8/1944 | Rupp | 180/66 R |
| 2,835,333 | 5/1958 | Hayes | 180/54 B |
| 3,044,595 | 7/1962 | Herr, Jr. | 192/48.91 X |
| 3,092,970 | 6/1963 | Sampietro | 60/421 X |
| 3,189,147 | 6/1965 | Holdeman | 192/48.91 |
| 3,451,342 | 6/1969 | Schwartzman | 60/36 X |
| 3,565,201 | 2/1971 | Petsinger | 180/54 |
| 3,570,261 | 3/1971 | Schwartzman | 60/36 X |
| 3,680,652 | 8/1972 | Greene | 180/66 R X |
| 3,681,609 | 8/1972 | Boese et al. | 180/66 B X |

Primary Examiner—Kenneth H. Betts
Assistant Examiner—David M. Mitchell

[57] ABSTRACT

A self-propelled machine includes a turbine engine driving fluid pumps which in turn can selectively either drive or impede the drive of traction wheels of the machine. Power to the turbine comes from the phase change and expansion of liquefied gas which serves as the energy transfer agent. The rapid expansion of the gas is accomplished by its circulation through a radiator-like heat exchange structure upon which the ambient air impinges as the machine moves through the atmosphere. The exhaust from the machine is only the gaseous form of the original liquid fuel which can be liquefied air, for example. A hydraulic clutch plate is driven by the turbine and is moved selectively toward first or second matching clutch plates to tend to drive one or the other of two fluid pumps to provide drive forces in either forward or reverse direction to the fluid traction wheel motors. Heat generated by action of the hydraulic clutch, and heat from other sources can be applied to the energy transfer agent to increase the rate of phase change and expansion of the liquefied gas.

8 Claims, 7 Drawing Figures

3,830,326

GAS TURBINE AUTOMOTIVE MACHINE

BACKGROUND OF THE INVENTION

This invention has relation to automotive machines and particularly to automotive vehicles which are turbine driven by gas forming and expanding from a liquefied energy transfer agent which is normally gaseous at ambient temperatures. In machines made according to the present invention, the turbine can drive fluid pumps capable of selectively furnishing fluids in forward or reverse direction to fluid motors operably connected to drive vehicle traction wheels.

The use and/or need for automotive transportation in the world today has forced the expansion of the use of reciprocating internal combustion engines and the fossil fuels which normally supply them to the point where pollution of the atmosphere with the products of combustion of such fuels, and depletion of the reserves of such fuel supplies tends to bring civilization as we know it today to a hault, or at least to substantially cripple it or slow it down.

A drawback to reciprocating internal combustion engines, and to any kind of reciprocating engine, for example a traditional steam engine, has been the necessary use of constructions of substantial mass to withstand the reversal forces necessarily set up in the reciprocating mechanism. Elimination of the reciprocating mechanism automatically makes it possible for the machine to be made much lighter. This reduces the amount of energy which must be expanded in getting the machine into motion and in getting it to stop again.

In a search for an acceptable substitute for the reciprocating internal combustion engine, much work has recently been done on the use of turbines. However, the generation of gas under pressure to drive such turbines has usually been limited to methods for the production of steam including super-heated steam. This has involved the generation and use of temperatures very substantially higher than the ambient temperatures in the atmosphere in which the vehicle will operate, and has produced inefficiencies due to heat losses and the like.

With the development of so-called "super-insulation", utilizing alternate layers of highly reflective and cold impervious materials, and by other methods, it is possible to efficiently store liquefied gases for substantial periods of time, and to transport them without substantial losses.

The liquefaction of such gases is accompanied by the incorporation into the liquid phase thereof of very considerable amounts of energy. A means for the release of this energy at a sufficiently high rate to drive a turbine with sufficient force to propel an automotive vehicle or other machine was not developed until the present invention.

BRIEF SUMMARY OF THE INVENTION

An automotive machine or self-propelled apparatus includes a tank for holding a liquefied gas at an extremely low temperature and under pressure. In order to propel such a machine, this liquefied gas is led through a radiator-like heat exchanger situated to be intimately contacted by flow of ambient atmosphere when the machine is in motion thus to subject the liquefied gas to a very substantial heat differential, causing it to boil or flash over into the vapor phase. This vapor phase, under the considerable pressure of the release of energy due to heat exchange in the relatively severely hot ambient atmosphere, is introduced into a turbine to drive that turbine and a drive shaft extending outwardly therefrom.

In the form of the invention as shown, a double acting hydraulic clutch in a fluid tight casing is associated with the turbine drive shaft and is selectively operable either to drive a first hydraulic pump in direction to furnish hydraulic fluid to at least one hydraulic motor to drive at least one traction wheel in a forward direction, or to drive a second hydraulic pump in direction to furnish hydraulic fluid to at least one hydraulic motor to drive at least one traction wheel in reverse direction.

The heat which will be generated in this hydraulic clutch mechanism can be utilized to advance the rate of energy release of the liquefied gas by leading the feed line from the gas holding tank to the turbine through suitable heat transfer coils inside of the hydraulic clutch casing, either before or after the fuel gas is led through the radiator-like heat exchanger. Similarly, an outside heat source can be utilized to transfer heat energy to the fuel gas as it passes between the storage tank and the turbine.

In one form of the invention, the turbine will be aligned so that the thrust of gases discharged from it will add a force component in the normal direction of forward travel of the machine, and so that the rotating of the turbine rotor and clutch plates will tend to have a gyroscopic effect to stabilize the machine against movement out of its longitudinal axis.

DESCRIPTION OF PREFERRED EMBODIMENTS

Figures 1, 5:
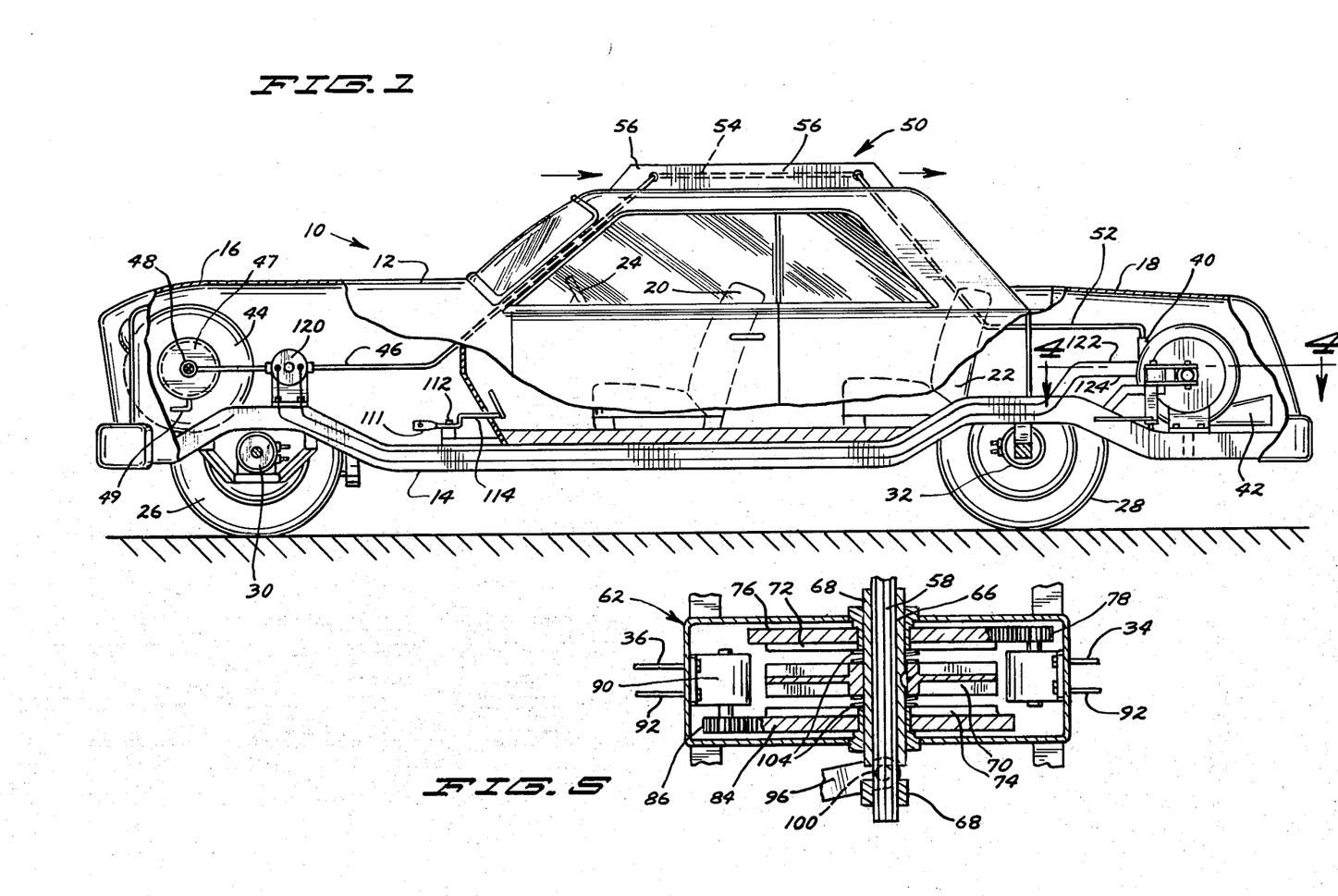
FIG. 1 is a side elevational view of an automotive vehicle or machine made according to the present invention with parts in section and parts broken away.
FIG. 5 is a fragmentary detail sectional view also taken on the line 4—4 in FIG. 1.

An automotive machine 10 is illustrated as having the general form of a now standard appearing automotive vehicle including a car body 12, a generally rectangular chassis 14, a front hood 16 and a rear hood 18. Conventional front and rear seats 20 and 22, respectively, are also illustrated. A steering wheel 24 is illustrated, but other details of the steering mechanism have been omitted for purposes of clarity.

Figures 2, 6, 7:
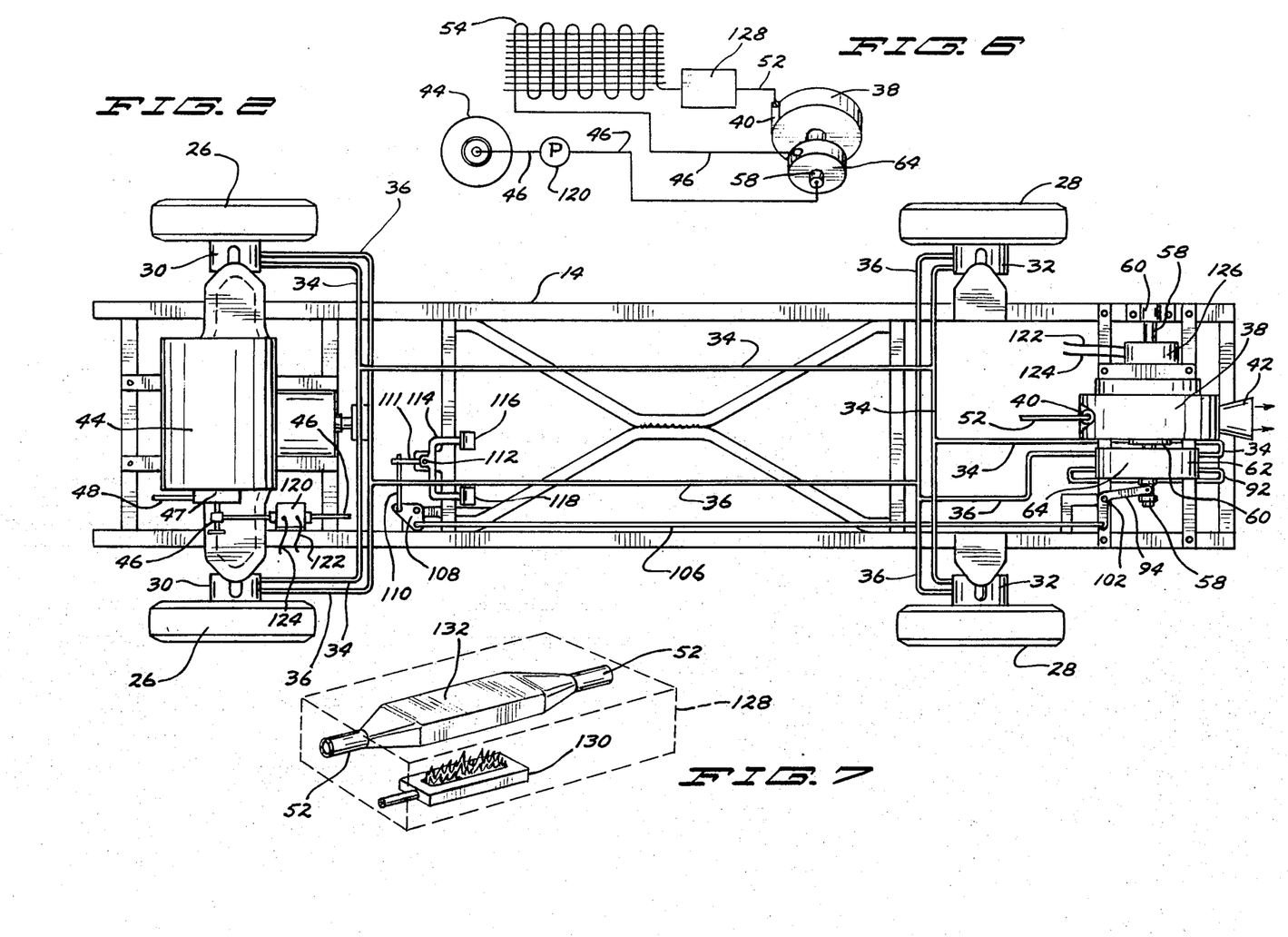
FIG. 2 is a top plan view of a chassis of the machine of FIG. 1 showing the relative positioning of a fuel storage tank, drive turbine, hydraulic clutch, hydraulic motors and traction drive wheels of the present invention.
FIG. 6 is a schematic representation of the elements of the invention and illustrating a feed path for fuel gas between the storage tank and the turbine which will be useful in utilizing the heat generated in the hydraulic clutch mechanism and in utilizing heat energy added from an outside source thereof.
FIG. 7 is a fragmentary exploded view of one embodiment for adding heat energy to the fuel line between the storage tank and the turbine.

Individually suspended from the chassis in any usual or preferred manner are front traction wheels 26,26 and rear traction wheels 28,28. The front traction wheels are directly connected to hydraulic drive motors 30,30; while rear traction wheels 28,28 are connected to hydraulic drive motors 32,32. A forward hydraulic drive line 34 is open to all four of the hydraulic motors 30,30 and 32,32; as is a reverse hydraulic drive line 36. Flow of hydraulic fluid from the forward drive line 34, through each of the motors, and back out hydraulic line 36 will result in rotation of the traction wheels in direction to move the vehicle 10 in forward direction. The reverse of such flow through these hydraulic lines will cause the motors to drive the traction wheels in vehicle reverse direction. When the wheels turn due to the momentum of the vehicle and without power from the engine, these motors 30 and 32 act as pumps and the flow through the hydraulic lines will be in the same direction.

While the hydraulic motors 30,30 and 32,32 are shown as being connected in parallel with each other through the lines 34 and 36, it is to be understood that they could all be connected in series with each other, or the two drive motors 30 and 32 on the upper side of the chassis as seen in FIG. 2 could be in series with each other while the drive motors 30 and 32 on the lower side in that figure could be in series with each other, thus insuring that there would be a positive drive of all four wheels at all times, or a positive drive of at least two of the wheels at all times.

A turbine engine 38 is fixedly mounted on the chassis 14 in any usual or preferred manner and includes an intake port 40 and an exhaust port 42 situated to discharge rearwardly of the car body to generate a thrust in the forward direction. The particular design of the turbine forms no essential part of the present invention, and any suitable design for utilizing the energy in expanding gas under pressure will be satisfactory at least in some degree.

A fuel storage tank 44 consists of a proper container for storing liquefied gases under pressure with a minimum of heat transfer losses from the outside. The design of this fuel tank forms no direct part of the present invention, and any tank which will store such fuel for extended periods under the pressures involved will be satisfactory.

Figures 3, 4:
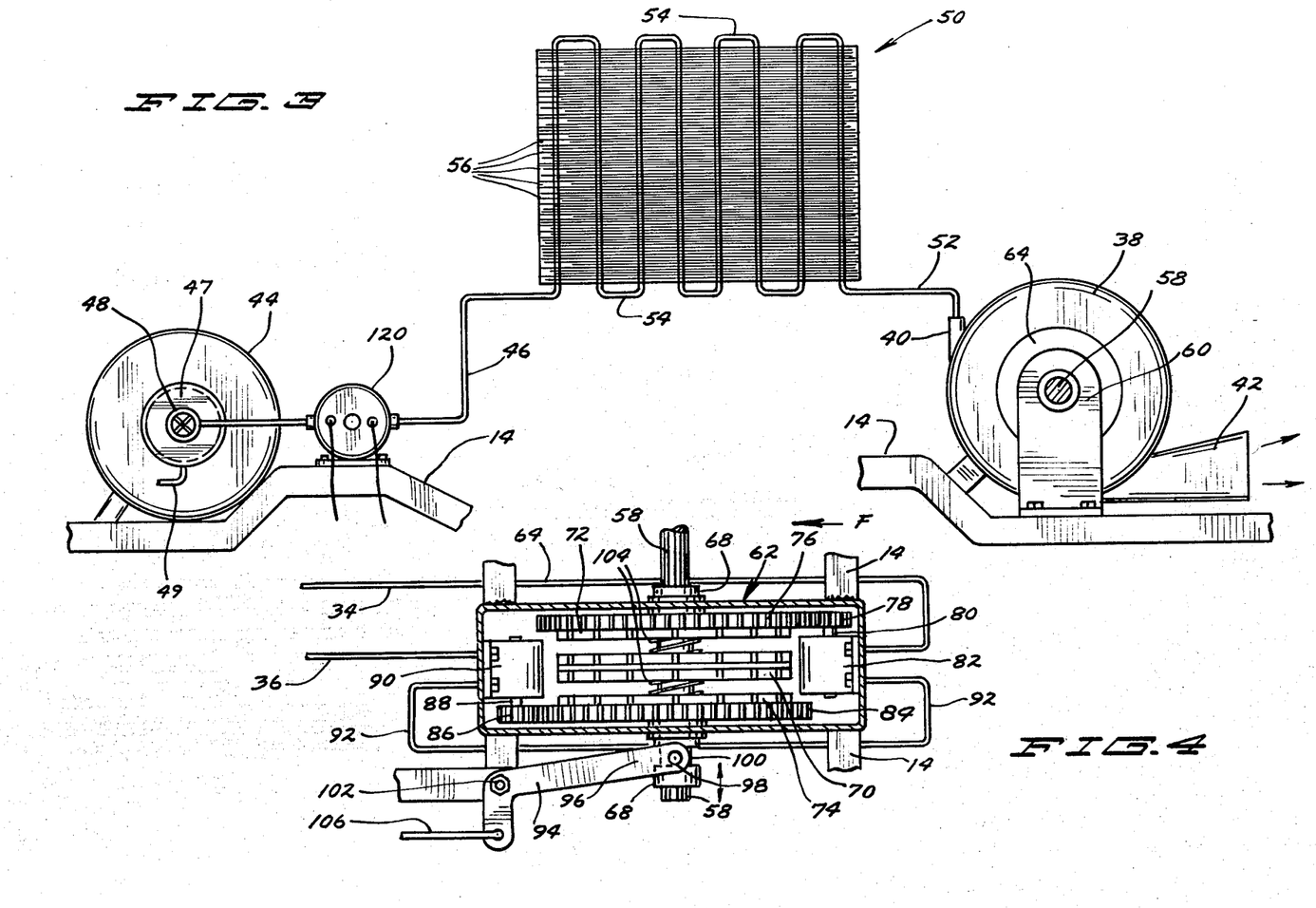
FIG. 3 is a schematic view showing the flow pattern of the fuel from liquid phase in the fuel storage tank through the heat exchanger and the drive turbine.
FIG. 4 is a horizontal sectional view of the two direction hydraulic clutch and its hydraulic pumps taken on the line 4—4 in FIG. 1.

As seen in FIGS. 1, 2 and 3, a feed line 46 extends from a pressure relief valve 47 connected to tank 44, through cutoff valve 48, and to a heat exchanger 50 located on top of the roof of the car body 12 as shown. From the heat exchanger, the gas passes along a feed line 52 to the turbine engine intake port 40.

The heat exchanger, as shown, consists of a serpentine coil of feed line 54, the outside of which is intimately in contact at many points with vertical, longitudinally extending fins 56 made of a material which readily conducts heat. While the feed line 46 is illustrated in FIG. 3 as connecting to the feed line 54 at the front of the heat exchanger, and the feed line 52 is shown open to the feed line 54 at the rear thereof, it is to be understood that these positions could be reversed, and the raw liquid fuel from the tank 44 could be introduced into the rear of the heat exchanger, passed up toward the front, and then directed to the turbine 38.

It is to be noted that the fins 56 lead the ambient air longitudinally down the heat exchanger and that the flow of air along the fins will be increased as the speed of the vehicle increases.

Turbine engine 38, of any usual or preferred construction, is provided with a driven shaft 58 which extends outwardly therefrom. This shaft is mounted in appropriate bearings 60 outside of the turbine, and also constitutes the drive shaft 58 of a hydraulic clutch 62. The clutch 62 includes an outer air-tight casing 64, which is supported in any convenient or preferred manner on the chassis 14. As best seen in FIG. 5, the drive shaft 58 has splined to it as at 66 a slidable sleeve 68. This sleeve carries a hydraulic clutch drive plate 70 in such a manner that when the drive shaft 58 causes the sleeve 68 to rotate, this drive plate 70 will likewise rotate.

Freely rotatably on the sleeve 68 and slidable therealong is a forward driven clutch plate 72 and a reverse driven clutch plate 74. As shown in FIGS. 4 and 5, integral with clutch plate 72 is an external gear 76. A pinion gear 78 meshes with this external gear and drives shaft 80 of forward hydraulic pump 82.

Similarly, an external gear 84 is integral with reverse driven clutch plate 74, and a pinion gear 86 meshes with it and drives a shaft 88 of reverse hydraulic pump 90.

Forward hydraulic drive line 34 and a first end of an interconnecting hydraulic line 92 extend from forward pump 82, while reverse hydraulic drive line 36 and the other end of interconnecting hydraulic line 92 extend from reverse pump 90. The action and construction of the hydraulic pumps 82 and 90 and the hydraulic motors 30,30 and 32,32 is such that when hydraulic fluid is forced in either direction into a particular pump or motor, that unit will tend to act as a motor, and when the drive shaft of one of these units is forceably turned, the unit will tend to act as a pump.

The inside of the casing 64 is filled with a suitable hydraulic fluid, but for clarity of illustration, no such symbol is shown in FIGS. 4 or 5.

As best seen in FIGS. 2 and 4, a crank arm 94 is pivotally mounted with respect to the chassis and the hydraulic clutch, and a yoke 96 on an outer end of that arm supports pins 98 which ride in a groove 100 provided in slidable sleeve 68 in such a manner that the pivoting of that crank arm 94 about pivot point 102 in a manner to be described will cause the sleeve to slide to position the clutch drive plate 70 either closer to forward driven clutch plate 72 or reverse driven clutch plate 74. Springs 104,104 acting between the clutch plates 70 and 72 on the one hand and 70 and 74 on the other keep the drive plate centered when no force is exerted on crank arm 94, and tend to keep the external gears 76 and 84 properly aligned with the pinions 78 and 86 at all times.

As best seen in FIG. 2, drive connection control rod 106 extends from the end of the crank arm 94 opposite the yoke 96 to a drive control pivot plate 108, and this control plate is connected to control rod 110 which is connected to a drive control arm 111 which pivots at 112 and which is integral with a yoke 114 supporting a forward pedal 116 and a reverse pedal 118.

In feed line 46 and adjacent fuel tank 44 is illustrated a liquefied air feed pump 120, designed to be driven by power supplied through electrical leads 122 and 124. These leads extend from an electrical generator 126 which can be operably mounted on driven shaft 58 of turbine 38. In instances where it is considered desirable to operate the turbine at a constant speed, this turbine speed can be monitored by suitable controls at the generator 126, and the power fed along leads 122 and 124 can be such as to increase or decrease the speed of the feed pump 120 to achieve and maintain the desired turbine speed. Alternatively, the speed of the turbine can be monitored at the generator or elsewhere, and a synchronizing signal can be sent through leads similar to leads 122 and 124 or otherwise to feed pump 120 to maintain the desired turbine speed.

In instances where greater or lesser turbine speeds are desired, these can also be achieved by varying the output of liquefied gas feed pump 120 in any usual or preferred manner.

OPERATION

To put the automotive machine of the invention into operation, the cutoff valve 48 to the feed line 46 is opened to allow the liquefied gas to enter that line. Pump 120 may be operated by any suitable means such as by battery connection (not shown) to cause an initial charge of liquefied gas to be passed through feed line 46 to the heat exchanger 50, where the extreme temperature differential, enhanced by the heat conducting fins 56 will cause the liquefied gas to flash over back to the vapor or gaseous state, where feed line 52 will carry it to the intake port 40 of turbine 38. With the parts of the hydraulic clutch 62 positioned as seen in FIG. 4, there will be no load on clutch drive shaft/turbine driven shaft 58, and the turbine rotor will build up speed, until a desired minimum operating speed is attained.

When this happens, the forward pedal 116 will be depressed by the operator if he wants to move the automotive machine or vehicle in forward direction, or the reverse pedal 118 will be depressed if he wants to move the vehicle backward.

Considering first the situation when the vehicle is to initially move in forward direction, forward movement of pedal 116 will cause the drive direction control rod 106 to move rearwardly with respect to the chassis, forcing yoke 96 of crank arm 94 in upward direction as seen in FIG. 4, thus moving the hydraulic clutch drive plate 70 in direction toward forward driven clutch plate 72. As is usual and well understood in connection with hydraulic clutches, this action, together with the action of the oil in the clutch casing, will impart similar rotative movement to forward driven clutch plate 72, rotating its associated pinion gear 78 to cause forward hydraulic pump 82 to force hydraulic fluid outwardly and through line 34 to each of the hydraulic traction drive motors 30,30 and 32,32. As these motors drive all four wheels to build up the speed of the machine, the air exchange past the serpentine feed line 54 and impinging on the fins 56 will impart more heat to the fuel and cause more rapid buildup of pressure and vapor in the system, to the end that more power can be delivered to the turbine more rapidly.

Thus as the speed of the vehicle increases, the heat exchange becomes greater, and the potential for developing power at the turbine becomes greater.

As pointed out above, should it be desirable to operate the turbine at a constant speed, the speed of the feed pump 120 will be appropriately regulated in any usual or preferred manner.

On the other hand, should it be desirable to increase and decrease the speed of the turbine, and consequently the power available through the pumps 82 and 90, regulation of the speed of the feed pump 120 can tend to accomplish this result.

Of course, if it is desired to have a closer control over the cutoff or application of power to the turbine, this can be accomplished through use of a throttle valve at an appropriate location along feed line 52 somewhere between heat exchanger 50 and intake port 40. Such control can be independent of or combined with the control afforded by control of the speed of liquefied gas feed pump 120.

As long as pedal 116 is depressed, there will be some degree of power transmitted between clutch drive plate 70 and forward driven clutch plate 72. When it is no longer desirable to power the machine in the forward direction, the operator's foot will be removed from the forward pedal 116, and the springs 104 will center the drive plate 70 to position as seen in FIG. 4.

Since the forward hydraulic drive pump 82 and the reverse hydraulic pump 90 are connected in a series with each other, when rotation of driven plate 72 causes operation of forward hydraulic pump 82 as a pump, the flow of fluid out through line 34 and the traction motors and back through line 36 into reverse hydraulic pump 90 will cause that pump to act as a motor, and will cause rotation of external gear 84 and reverse driven clutch plate 74 in reverse direction with respect to the rotation of clutch is terminated, the momentum of the vehicle will cause the traction motors each to drive as pumps, and both the forward hydraulic pump 82 and the reverse hydraulic pump 90 will be driven as motors to keep the driven clutch plates and their external gears rotating in opposite directions with respect to each other.

When it is desired to brake the vehicle movement in forward direction, then it is only necessary to depress reverse pedal 118, causing the slidable sleeve 68 to move downwardly as seen in FIG. 4, bringing the drive plate 70, rotating in the first direction, under the drive of the turbine and through shaft 58 into close proximity with the reverse driven clutch plate 74 which will at this point be rotating in the opposite direction. Sufficient force is applied to reverse pedal 118 to cause sufficient power to be transmitted between plates 70 and 74 so that the flow of hydraulic fluids through lines 36 and 34 is stopped. At this point, the motors and consequently the traction wheels will also be stopped.

Obviously if drive is desired in reverse direction, the reverse pedal 118 is left in its depressed condition, and power transmitted through the clutch plates will cause the reverse driven clutch plate 72 to begin moving in the same direction as plate 70, causing hydraulic fluid to be forced outwardly from pump 90, at that point acting as a pump, to cause the motors 30,30 and 32,32 as well as forward pump 82 to act as motors.

With the turbine rotor (not shown) rotating at a constant or other desired speed on an axis transverse of the car chassis, and with the clutch drive plate 70 rotating on the same axis, there is a gyroscopic stabilizing influence felt which will tend to keep the automotive machine travelling in this longitudinal alignment with the plane of rotation of these parts.

The exhaust gases expended from the exhaust port 42 of the turbine 38 will have a jet reaction influence on the turbine, and hence on the chassis and the body of the machine, in a forward direction.

The exhaust from the port 42 will be simply the vapor phase of the original liquefied gas. Should air itself be liquefied to form the fuel for this engine, the exhaust gases discharging from the machine will have the same chemical composition as the air in which the vehicle is operated. If, however, the air is liquefied originally at a location where the atmosphere is not polluted, then the air discharging from the machine will be more pure and will tend to dilute the polluted air in the vicinity of the machine by making it purer than it originally was.

Since all reciprocating parts have been eliminated from the prime mover, the mass of the machine and of its controls and parts need not be built to withstand the reciprocating forces, and the resulting machine will be much lighter, necessitating less power to move it and to stop it.

As seen in FIGS. 1, 2 and 3, a pressure relief pipe 49 extends from pressure relief valve 47. When an excessive pressure builds up in the storage tank 44, as when the vehicle is parked for an extended period of time, for example, the discharge from pipe 49 can be directed to an air conditioning unit. Thus, connections from the pipe 49 to suitable locations for use of sufficient liquid gas to relieve the excess cold vapors at the private dwellings and/or commercial establishments adjacent where the vehicle is parked can insure maximum use of this blow-off. Not only necessary blow-off liquefied gas can be so used, but the pressure relief valve 47 can be otherwise actuated to draw liquid fuel from the storage tank 44 while the vehicle is parked should this be necessary or desirable to cool the area adjacent the parked vehicle, for example, even when there is no need to relieve excessive pressure.

With the advent of so-called super insulation, fuel can be stored in fuel tanks such as tank 44 for very substantial periods of time. Further, snap-on discharge connections (not shown) can be utilized to rapidly drain the fluid from the tank, when the engine is not to be used (for example overnight), and the fluid can be stored in even larger containers located adjacent to the garage where the vehicle is stored, which tanks will be even more efficient in holding not only the limited quantity required by tank 44, but also a substantial reserve quantity of fuel.

The schematic representation of FIG. 6 shows one effective way of utilizing the heat generated in the hydraulic clutch 62. It also shows an effective point of connection of a heat transfer element for adding energy to the fuel.

In FIG. 6, feed line 46 from storage tank 44 is illustrated as passing through the oil tight casing 64 of the hydraulic clutch 62. Although the internal piping is not shown, this can be the straight pass through the casing, or can include a serpentine winding of the type illustrated at feed line 54. As shown, this feed line 46 extends from the hydraulic clutch so the serpentine feed line 54, the fuel passing out from the line 54 into the feed line 52.

Indicated at 128 is a heat transfer unit for feeding additional heat energy to the fuel passing to the turbine 38 through intake port 40. As seen in FIG. 4, one possible form of the heat transfer unit can include a heat source 130 utilizing gas from a source not shown, oil or gasoline, radiant energy such as that from a laser beam, or any other usual or preferred heat source situated in close, heat transmitting, relationship to a flattened, elongated, widened, hollow, heat transfer portion 132 of integral feed line 52.

While the hydraulic clutch heat transfer point is shown in advance of the atmospheric heat transfer point, and while the auxiliary heat transfer unit 128 is shown after this, it is to be understood, that this order could be varied, and one or more of the heat transfer elements could be eliminated. In fact, if the heat were added directly to the storage tank, under certain conditions, the liquefied gas feed pump 120 could also be eliminated.

Throughout the specification, the term fuel is used to refer to the originally liquefied gas in whatever state it is at a particular point in its passage to the turbine engine 38, even though this fuel is not consumed in the usual manner.

The embodiments of the invention in which an exclusive property or privilege is claimed are defined as follows:

1. An automotive machine for running on the ground and in the ambient atmosphere, said machine including:
  A. a main frame;
  B. wheels supporting said main frame on the ground;
  C. at least one of said wheels being a traction wheel;
  D. a storage tank for a liquid which is normally gaseous at ambient temperatures, said tank being supported on said frame;
  E. a quantity of liquefied gas in said tank;
  F. a gas turbine engine having a rotor shaft and being capable of converting energy from gas under pressure into mechanical motion in the form of rotation of said shaft;
  G. a heat exchanger supported on said frame and made of material having relatively high heat conductivity, said exchanger including:
    1. a conduit having a first entrance opening, an elongated, heat exchange, hollow body and a second discharge opening, and
    2. a plurality of fins in contacting, heat conducting, relation to said conduit;
  H. a first feed pipe open to said liquid in said tank and to said first entrance opening in said heat exchange conduit;
  I. a second feed pipe open to said second discharge opening in said heat exchanger conduit and to said engine;
  J. pump means for charging liquefied gas from said tank through said first pipe and into said heat exchanger;
  K. said heat exchanger being supported in position to be air warmed by the passage of the machine through the ambient atmosphere; and
  L. means for transmitting mechanical motion at said engine to said traction wheel to cause it to propel said machine, said motion transmitting means including:
    1. a hydraulic drive motor having an output shaft drivingly associated with said traction wheel;
    2. a hydraulic clutch mechanism having:
      a. a fluid-tight outer casing,
      b. a suitable hydraulic fluid in said casing, c. a first clutch plate mounted to rotate responsive to the rotation of said rotor shaft,
d. a first hydraulic pump, and a second hydraulic pump,
e. a second clutch plate in driving relation to said first hydraulic pump,
f. a third clutch plate in driving relation to said second hydraulic pump;
3. hydraulic drive lines connecting said first and second pumps in series with each other in such a manner to cause said such clutch plates to rotate in opposite directions with respect to each other when hydraulic fluid flows through said lines;
4. hydraulic drive lines extending between said first and second hydraulic pumps and said hydraulic motor; and
5. normally inoperative means for selectively first bringing said first and second clutch plates into close proximity with each other to tend to cause rotation of said first clutch plate to be imparted to the second clutch plate to force hydraulic fluid through said drive lines and said drive motor to cause said motor to drive said traction wheel to drive said machine in a first forward direction, and secondly for bringing said first and third clutch plates into close proximity with each other to tend to cause rotation of the first clutch plate to be imparted to the third clutch plate to force hydraulic fluid through said drive lines and said drive motor to cause said motor to drive said traction wheel to drive said machine in a second, reverse direction.

2. The combination as specified in claim 1 wherein said pump means for charging liquefied gas from said tank and into said heat exchanger derives at least part of its power from the operation of said turbine.

3. The combination as specified in claim 2 and means for controlling the output of said pump means responsive to the speed of rotation of the turbine.

4. The combination as specified in claim 1 and means including a heat source for imparting heat energy to said feed pipes at location between said tank and said engine.

5. The combination as specified in claim 4 wherein said means for imparting heat energy includes positioning of at least one of said feed pipes to pass in heat exchanging relation to said hydraulic fluid from said hydraulic clutch casing.

6. An automotive machine for running on the ground and in the ambient atmosphere, said machine including:
A. a main frame;
B. wheels supporting said main frame on the ground;
C. at least one of said wheels being a traction wheel;
D. a storage tank for a liquid which is normally gaseous at ambient temperatures, said tank being supported on said frame;
E. a quantity of liquefied gas in said tank;
F. a gas turbine engine having a rotor shaft and being capable of converting energy from gas under pressure into mechanical motion in the form of rotation of said shaft;

G. a heat exchanger supported on said frame and made of material having relatively high heat conductivity, said exchanger including:
1. a conduit having a first entrance opening, an elongated, heat exchange, hollow body and a second discharge opening, and
2. a plurality of fins in contacting, heat conducting, relation to said conduit;
H. a first feed pipe open to said liquid in said tank and to said first entrance opening in said heat exchange conduit;
I. a second feed pipe open to said second discharge opening in said heat exchanger conduit and to said engine;
J. means including a heat source for imparting additional heat energy to said feed pipes at location between said tank and said engine;
K. said heat exchanger being supported in position to be air warmed by the passage of the machine through the ambient atmosphere; and
L. means for transmitting mechanical motion at said engine to said traction wheel to cause it to propel said machine, said motion transmitting means including:
1. a hydraulic drive motor having an output shaft drivingly associated with said traction wheel;
2. a hydraulic clutch mechanism having:
a. a fluid-tight outer casing;
b. a suitable hydraulic fluid in said casing;
c. a first clutch plate mounted to rotate responsive to the rotation of said rotor shaft;
d. a first hydraulic pump; and
e. a second clutch plate in driving relation to said first hydraulic pump;
3. first and second hydraulic drive lines extending between said first hydraulic pump and said hydraulic motor; and
4. normally inoperative means for selectively first bringing said first and second clutch plates into close proximity with each other to tend to cause rotation of said first clutch plate to be imparted to the second clutch plate to force hydraulic fluid through said drive lines and said drive motor to cause said motor to drive said traction wheel to drive said machine in a first forward direction.

7. The combination as specified in claim 6 wherein said means for imparting heat energy includes positioning at least one of said feed pipes to pass in heat exchanging relation to said hydraulic fluid from said hydraulic clutch casing.

8. An automotive machine for running on the ground, said machine including:
A. a main frame;
B. wheels supporting said main frame on the ground;
C. at least one of said wheels being a traction wheel;
D. an engine and a rotor shaft supported on said main frame, said engine being capable of converting energy into mechanical motion in the form of rotation of said shaft; and
E. means for transmitting mechanical motion at said engine to said traction wheel to cause it to propel said machine, said motion transmitting means including:
1. a hydraulic drive motor having an output shaft drivingly associated with said traction wheel;

2. a hydraulic clutch mechanism having:
   a. a fluid-tight outer casing,
   b. a suitable hydraulic fluid in said casing,
   c. a first clutch plate mounted to rotate responsive to the rotation of said rotor shaft,
   d. a first hydraulic pump, and a second hydraulic pump,
   e. a second clutch plate in driving relation to said first hydraulic pump, and
   f. a third clutch plate in driving relation to said second hydraulic pump;
3. hydraulic drive lines connecting said first and second pumps in series with each other in such a manner to cause said clutch plates to rotate in opposite directions with respect to each other when hydraulic fluid flows through said lines;
4. hydraulic drive lines extending between said first and second hydraulic pumps and said hydraulic motor; and
5. normally inoperative means for selectively first bringing said first and second clutch plates into close proximity with each other to tend to cause rotation of said first clutch plate to be imparted to the second clutch plate to force hydraulic fluid through said drive lines and said drive motor to cause said motor to drive said traction wheel to drive said machine in a first forward direction, and secondly for bringing said first and third clutch plates into close proximity with each other to tend to cause rotation of the first clutch plate to be imparted to the third clutch plate to force hydraulic fluid through said drive lines and said drive motor to cause said motor to drive said traction wheel to drive said machine in a second, reverse direction.

* * * * *

UNITED STATES PATENT OFFICE
CERTIFICATE OF CORRECTION

Patent No. 3,830,326    Dated August 20, 1974

Inventor(s) RAYMOND E. HARTUNG

It is certified that error appears in the above-identified patent and that said Letters Patent are hereby corrected as shown below:

Column 1, line 21, "hault" should be --halt--.

Column 2, lines 57 and 58, "embodiment" should be --arrangement--.

Column 6, line 31, after "clutch", insert --plates 70 and 72. When the power transfer within the clutch--.

Signed and sealed this 19th day of November 1974.

(SEAL)
Attest:

McCOY M. GIBSON JR.          C. MARSHALL DANN
Attesting Officer            Commissioner of Patents